United States Patent
Johnston et al.

(10) Patent No.: US 10,204,086 B1
(45) Date of Patent: Feb. 12, 2019

(54) DOCUMENT PROCESSING SERVICE FOR DISPLAYING COMMENTS INCLUDED IN MESSAGES

(71) Applicant: Google Inc., Mountain View, CA (US)

(72) Inventors: Scott M. Johnston, Darien, CT (US); Mandy Richau Sladden, Lafayette, CO (US); Ian Gunn, San Anselmo, CA (US); Nicholas Cooper, Annandale (AU)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/673,809

(22) Filed: Mar. 30, 2015

Related U.S. Application Data

(63) Continuation of application No. 13/249,442, filed on Sep. 30, 2011, now Pat. No. 8,996,985.

(60) Provisional application No. 61/453,238, filed on Mar. 16, 2011.

(51) Int. Cl.
  *G06F 17/00* (2006.01)
  *G06F 17/22* (2006.01)
  *H04L 12/58* (2006.01)
  *G06F 17/24* (2006.01)

(52) U.S. Cl.
  CPC .......... *G06F 17/2235* (2013.01); *G06F 17/24* (2013.01); *G06F 17/241* (2013.01); *H04L 51/046* (2013.01)

(58) Field of Classification Search
  CPC .................................................. G06F 17/241
  See application file for complete search history.

(56) References Cited

U.S. PATENT DOCUMENTS

| | | | |
|---|---|---|---|
| 5,231,577 A | 7/1993 | Koss | |
| 5,408,470 A | 4/1995 | Rothrock et al. | |
| 5,557,722 A | 9/1996 | DeRose et al. | |
| 5,708,826 A | 1/1998 | Ikeda et al. | |
| 5,758,358 A | 5/1998 | Ebbo | |
| 5,761,669 A | 6/1998 | Montague et al. | |
| 5,781,732 A | 7/1998 | Adams | |
| 5,793,966 A | 8/1998 | Amstein et al. | |
| 5,799,325 A | 8/1998 | Rivette et al. | |
| 5,819,304 A | 10/1998 | Nilsen et al. | |
| 5,999,932 A | 12/1999 | Paul | |
| 6,049,664 A | 4/2000 | Dale et al. | |
| 6,061,697 A | 5/2000 | Nakao | |
| 6,073,144 A | 6/2000 | van Hoff | |
| 6,243,706 B1 | 6/2001 | Moreau et al. | |

(Continued)

OTHER PUBLICATIONS

"Comment Email Responder," from website Ugh's Greymatter Honeypot, retrieved from Internet Archive Wayback Machine capture on Mar. 4, 2010, p. 1-2, available at https://web.archive.org/web/20100304221737/http://www.u-g-h.com/wordpress-plugins/wordpress-plugin-comment-email-responder.*

(Continued)

*Primary Examiner* — Amelia L Tapp
(74) *Attorney, Agent, or Firm* — Lowenstein Sandler LLP

(57) ABSTRACT

A plurality of comments associated with a document is received, and a representation of the document and a representation of a comment thread comprising the plurality of comments are displayed simultaneously on a user device. In one embodiment, a first comment is received from a first user and a second comment is received from a second user. The comment thread may be stored. Systems and apparatus are also disclosed.

16 Claims, 11 Drawing Sheets

(56) References Cited

U.S. PATENT DOCUMENTS

| | | | |
|---|---|---|---|
| 6,327,584 B1 | 12/2001 | Xian et al. | |
| 6,341,305 B2 | 1/2002 | Wolfe | |
| 6,349,308 B1 | 2/2002 | Whang et al. | |
| 6,349,314 B1 | 2/2002 | Patel | |
| 6,377,957 B1 | 4/2002 | Jeyaraman | |
| 6,418,441 B1 | 7/2002 | Call | |
| 6,438,564 B1 | 8/2002 | Morton et al. | |
| 6,501,779 B1 | 12/2002 | McLaughlin et al. | |
| 6,525,747 B1 * | 2/2003 | Bezos | G06Q 10/107 715/751 |
| 6,544,294 B1 | 4/2003 | Greenfield et al. | |
| 6,766,333 B1 | 7/2004 | Wu et al. | |
| 6,907,565 B1 | 6/2005 | Huang | |
| 6,988,241 B1 | 1/2006 | Guttman et al. | |
| 7,017,112 B2 | 3/2006 | Collie et al. | |
| 7,031,954 B1 | 4/2006 | Kirsch | |
| 7,035,910 B1 | 4/2006 | Dutta et al. | |
| 7,069,502 B2 | 6/2006 | Numata et al. | |
| 7,107,518 B2 * | 9/2006 | Ramaley | G06Q 40/04 715/235 |
| 7,162,693 B2 | 1/2007 | Yamanaka et al. | |
| 7,213,199 B2 | 5/2007 | Humenansky et al. | |
| 7,222,156 B2 * | 5/2007 | Gupta | G06F 17/241 709/206 |
| 7,263,497 B1 | 8/2007 | Wiser et al. | |
| 7,305,613 B2 | 12/2007 | Oezgen | |
| 7,325,199 B1 | 1/2008 | Reid | |
| 7,328,243 B2 | 2/2008 | Yeager et al. | |
| 7,350,142 B2 | 3/2008 | Kraft et al. | |
| 7,437,421 B2 | 10/2008 | Bhogal et al. | |
| 7,478,330 B1 | 1/2009 | Branson et al. | |
| 7,491,399 B2 | 2/2009 | Vakharia | |
| 7,506,242 B2 | 3/2009 | Kotler et al. | |
| 7,529,778 B1 | 5/2009 | Dewey et al. | |
| 7,536,633 B2 | 5/2009 | Faraday et al. | |
| 7,634,728 B2 | 12/2009 | Kraft | |
| 7,656,543 B2 | 2/2010 | Atkins | |
| 7,667,862 B2 | 2/2010 | Ziegler et al. | |
| 7,680,932 B2 | 3/2010 | Defaix et al. | |
| 7,698,379 B2 | 4/2010 | Dutta et al. | |
| 7,737,996 B2 | 6/2010 | Gerhard et al. | |
| 7,761,796 B2 | 7/2010 | Faraday et al. | |
| 7,769,810 B1 | 8/2010 | Kaufman | |
| 7,774,703 B2 | 8/2010 | Junuzovic et al. | |
| 7,818,678 B2 | 10/2010 | Massand | |
| 7,818,679 B2 | 10/2010 | Clarke | |
| 7,890,928 B2 | 2/2011 | Patrudu | |
| 7,937,663 B2 | 5/2011 | Parker et al. | |
| 7,941,399 B2 | 5/2011 | Bailor et al. | |
| 8,019,780 B1 | 9/2011 | Pinkerton et al. | |
| 8,108,464 B1 | 1/2012 | Rochelle et al. | |
| 8,151,204 B2 | 4/2012 | Lusen et al. | |
| 8,266,534 B2 | 9/2012 | Curtis et al. | |
| 8,464,164 B2 * | 6/2013 | Hon | G06F 17/30873 715/751 |
| 8,621,012 B2 * | 12/2013 | Jackson | G06Q 10/107 709/204 |
| 8,621,021 B2 * | 12/2013 | Provo | G06Q 10/107 709/206 |
| 8,966,362 B2 * | 2/2015 | Smetters | G06F 17/218 715/255 |
| 9,292,481 B2 * | 3/2016 | Mangini | G06F 17/24 |
| 2001/0037346 A1 | 11/2001 | Johnson | |
| 2002/0032701 A1 | 3/2002 | Gao et al. | |
| 2002/0035580 A1 | 3/2002 | Tanabe | |
| 2002/0042838 A1 | 4/2002 | Tabayoyon et al. | |
| 2002/0051185 A1 | 5/2002 | Yamaguchi et al. | |
| 2002/0133492 A1 | 9/2002 | Goldstein et al. | |
| 2002/0156803 A1 | 10/2002 | Maslov et al. | |
| 2002/0174085 A1 | 11/2002 | Nelson et al. | |
| 2002/0188631 A1 | 12/2002 | Tiemann et al. | |
| 2002/0194302 A1 | 12/2002 | Blumberg | |
| 2003/0014406 A1 | 1/2003 | Faieta et al. | |
| 2003/0037076 A1 | 2/2003 | Bravery et al. | |
| 2003/0037303 A1 | 2/2003 | Bodlaender et al. | |
| 2003/0070176 A1 | 4/2003 | Parker et al. | |
| 2003/0084078 A1 | 5/2003 | Torii et al. | |
| 2003/0105719 A1 | 6/2003 | Berger et al. | |
| 2003/0145279 A1 | 7/2003 | Bourbakis et al. | |
| 2003/0208541 A1 | 11/2003 | Musa | |
| 2004/0030697 A1 | 2/2004 | Cochran et al. | |
| 2004/0044965 A1 | 3/2004 | Toyama et al. | |
| 2004/0051736 A1 | 3/2004 | Daniell | |
| 2004/0059783 A1 | 3/2004 | Kazui et al. | |
| 2004/0064733 A1 | 4/2004 | Gong | |
| 2004/0085354 A1 | 5/2004 | Massand | |
| 2004/0088374 A1 | 5/2004 | Webb et al. | |
| 2004/0088653 A1 | 5/2004 | Bell et al. | |
| 2004/0133444 A1 | 7/2004 | Defaix et al. | |
| 2004/0172450 A1 | 9/2004 | Edelstein et al. | |
| 2004/0205664 A1 | 10/2004 | Prendergast | |
| 2004/0215672 A1 | 10/2004 | Pfitzner | |
| 2004/0215825 A1 | 10/2004 | Pfitzner | |
| 2004/0215826 A1 | 10/2004 | Pfitzner | |
| 2004/0216090 A1 | 10/2004 | Kaler et al. | |
| 2004/0248612 A1 | 12/2004 | Lee et al. | |
| 2004/0255005 A1 | 12/2004 | Spooner | |
| 2004/0267871 A1 | 12/2004 | Pratley et al. | |
| 2005/0055337 A1 | 3/2005 | Bebo et al. | |
| 2005/0091291 A1 | 4/2005 | Kaler et al. | |
| 2005/0097061 A1 | 5/2005 | Shapiro et al. | |
| 2005/0125461 A1 | 6/2005 | Filz | |
| 2005/0131887 A1 | 6/2005 | Rohrabaugh et al. | |
| 2005/0144256 A1 | 6/2005 | Blumberg | |
| 2005/0185636 A1 | 8/2005 | Bucher | |
| 2005/0198305 A1 * | 9/2005 | Pezaris | H04L 51/12 709/227 |
| 2005/0198612 A1 | 9/2005 | Gonzalez | |
| 2005/0200896 A1 | 9/2005 | Narusawa et al. | |
| 2005/0209914 A1 | 9/2005 | Nguyen et al. | |
| 2005/0216827 A1 | 9/2005 | Mochizuki | |
| 2005/0273695 A1 | 12/2005 | Schnurr | |
| 2006/0020670 A1 | 1/2006 | Anderson | |
| 2006/0031751 A1 | 2/2006 | Ehud | |
| 2006/0036692 A1 | 2/2006 | Morinigo et al. | |
| 2006/0075332 A1 | 4/2006 | Fairweather et al. | |
| 2006/0080432 A1 | 4/2006 | Spataro et al. | |
| 2006/0095527 A1 | 5/2006 | Malik | |
| 2006/0101071 A1 | 5/2006 | Henderson | |
| 2006/0129627 A1 | 6/2006 | Phillips et al. | |
| 2006/0136513 A1 | 6/2006 | Ngo et al. | |
| 2006/0149831 A1 | 7/2006 | Dutta et al. | |
| 2006/0168044 A1 | 7/2006 | Chen et al. | |
| 2006/0200755 A1 | 9/2006 | Melmon et al. | |
| 2006/0206500 A1 | 9/2006 | Komamura et al. | |
| 2006/0230344 A1 | 10/2006 | Jennings et al. | |
| 2006/0235933 A1 | 10/2006 | Baluja et al. | |
| 2006/0248129 A1 | 11/2006 | Carnes et al. | |
| 2006/0282762 A1 * | 12/2006 | Diamond | G06F 17/241 715/235 |
| 2007/0033654 A1 | 2/2007 | Wilson | |
| 2007/0061714 A1 | 3/2007 | Stuple et al. | |
| 2007/0070066 A1 | 3/2007 | Bakhash | |
| 2007/0106729 A1 | 5/2007 | Adams et al. | |
| 2007/0118598 A1 | 5/2007 | Bedi et al. | |
| 2007/0143425 A1 | 6/2007 | Kieselbach et al. | |
| 2007/0162840 A1 | 7/2007 | Rochelle et al. | |
| 2007/0186157 A1 | 8/2007 | Walker et al. | |
| 2007/0208992 A1 | 9/2007 | Koren | |
| 2007/0220068 A1 | 9/2007 | Thompson et al. | |
| 2007/0233459 A1 | 10/2007 | Perronnin | |
| 2007/0233811 A1 | 10/2007 | Rochelle et al. | |
| 2007/0288637 A1 | 12/2007 | Layton et al. | |
| 2008/0010372 A1 | 1/2008 | Khedouri et al. | |
| 2008/0028302 A1 | 1/2008 | Meschkat | |
| 2008/0040659 A1 | 2/2008 | Doyle | |
| 2008/0059417 A1 | 3/2008 | Yamada et al. | |
| 2008/0059539 A1 | 3/2008 | Chin et al. | |
| 2008/0082604 A1 | 4/2008 | Mansour et al. | |
| 2008/0126943 A1 | 5/2008 | Parasnis et al. | |
| 2008/0127212 A1 | 5/2008 | Nakamizo et al. | |
| 2008/0222273 A1 | 9/2008 | Lakshmanan et al. | |
| 2008/0301560 A1 | 12/2008 | Rogers et al. | |

(56) References Cited

U.S. PATENT DOCUMENTS

| | | |
|---|---|---|
| 2009/0070306 A1 | 3/2009 | Stroe et al. |
| 2009/0089293 A1 | 4/2009 | Garritano et al. |
| 2009/0089664 A1 | 4/2009 | Wagner et al. |
| 2009/0112953 A1 | 4/2009 | Barsness et al. |
| 2009/0112990 A1 | 4/2009 | Campbell et al. |
| 2009/0119572 A1 | 5/2009 | Koivunen |
| 2009/0129596 A1* | 5/2009 | Chavez ............... G06F 17/241 380/277 |
| 2009/0132907 A1 | 5/2009 | Shao et al. |
| 2009/0164620 A1 | 6/2009 | Ziegler et al. |
| 2009/0249224 A1 | 10/2009 | Davis et al. |
| 2009/0307585 A1 | 12/2009 | Tranchant et al. |
| 2010/0005398 A1 | 1/2010 | Pratley et al. |
| 2010/0017694 A1 | 1/2010 | Wick et al. |
| 2010/0030578 A1 | 2/2010 | Siddique et al. |
| 2010/0050089 A1 | 2/2010 | Kim et al. |
| 2010/0083096 A1 | 4/2010 | Dupuis-Latour et al. |
| 2010/0095198 A1* | 4/2010 | Bultrowicz ............ G06Q 10/00 715/234 |
| 2010/0205230 A1 | 8/2010 | Simeonov et al. |
| 2010/0205520 A1 | 8/2010 | Parish et al. |
| 2010/0218099 A1 | 8/2010 | van Melle et al. |
| 2010/0229086 A1 | 9/2010 | Howell et al. |
| 2010/0235763 A1 | 9/2010 | Massand |
| 2010/0241968 A1 | 9/2010 | Tarara et al. |
| 2010/0245256 A1 | 9/2010 | Estrada et al. |
| 2010/0251122 A1 | 9/2010 | Lee et al. |
| 2010/0281076 A1 | 11/2010 | Pan et al. |
| 2010/0309436 A1 | 12/2010 | Allen, Jr. et al. |
| 2010/0318894 A1 | 12/2010 | Billharz et al. |
| 2011/0035661 A1 | 2/2011 | Balinsky et al. |
| 2011/0066957 A1 | 3/2011 | Prats et al. |
| 2011/0078246 A1 | 3/2011 | Dittmer-Roche |
| 2011/0085211 A1 | 4/2011 | King et al. |
| 2011/0099093 A1 | 4/2011 | Mills |
| 2011/0164043 A1 | 7/2011 | Arora et al. |
| 2011/0179427 A1 | 7/2011 | Krishnamoorthy et al. |
| 2011/0209052 A1 | 8/2011 | Parker et al. |
| 2011/0219331 A1 | 9/2011 | DeLuca et al. |
| 2011/0252299 A1 | 10/2011 | Lloyd et al. |
| 2011/0252335 A1 | 10/2011 | Lloyd et al. |
| 2011/0252339 A1 | 10/2011 | Lemonik et al. |
| 2011/0264712 A1 | 10/2011 | Ylonen |
| 2011/0282933 A1 | 11/2011 | Schmier |
| 2011/0296299 A1 | 12/2011 | Parker |
| 2012/0023392 A1 | 1/2012 | Cierniak et al. |
| 2012/0117406 A1 | 5/2012 | Eun |
| 2012/0117452 A1 | 5/2012 | Lloyd et al. |
| 2012/0131483 A1 | 5/2012 | Archer et al. |
| 2013/0246901 A1 | 9/2013 | Massand |
| 2013/0262574 A1 | 10/2013 | Cohen |
| 2014/0082093 A1 | 3/2014 | Savage |

OTHER PUBLICATIONS

Rowse, "5 Comment Management Plugins for WordPress," Aug. 21, 2007, p. 1-19, retrieved from https://problogger.com/5-comment-management-plugins-for-wordpress.*

"Simultaneously edit a presentation with other authors," by MicrosoftTM Office: MAC, published Nov. 11, 2010, pp. 1-4.

"User Levels," WordPress, retrieved from the internet at http://codex.wordpress.org/User_Levels, Jul. 1, 2005, 2 pages.

Bibi et al., "A Platform for Delivering Multimedia Presentations on Cultural Heritage," 2010 14th Panhellenic Conference on Informatics, pp. 175-179.

Ellis et al., "Concurrency Control in Groupware Systems," ACM 1989, pp. 399-407.

Huang et al., "A General Purpose Virtual Collaboration Room," Google 1999, pp. 1-9.

Kindberg, "Mushroom: A Framework for Collaboration and Interaction across the Internet," Google 1996, pp. 1-11.

Krieger, "Documents, Presentations, and Workbooks: Using Microsoft® Office to Create Content That Gets Noticed," published May 2011, pp. 1-104.

Mulvany, "What's Going on in Indexing," ACM 1997, pp. 10-15.

Munteaunu et al., "Collaborative Editing for Improved Usefulness and Usability of Transcript-Enhanced Webcasts," ACM Apr. 5-10, 2008, pp. 373-382.

Pacull et al., "Duplex: A Distributed Collaborative Editing Environment in Large Scale," ACM Oct. 1994, pp. 165-173.

Raggett, Dave, "Slidy—a web based alternative to Microsoft PowerPoint," published 2006, pp. 1-13.

Taylor, "Cool Apple Keynote Presentation Tricks and Tips," published Apr. 2011, p. 1-5.

McCue, Acrobat Production Tips. Real World Print Production with Adobe Creative Suite Applications, copyright 2009, Chapter 12, pp. 1-40.

Wikipedia "Help: Using talk pages", retrieved by Internet Archive Wayback Machine Jul. 1, 2010, http://web.archive.org/web/20100701123005/http://en.wikipedia.org/wiki/Help:Using_talk_pages (pp. 1-4).

Wikipedia "Signatures", retrieved by Internet Archive Wayback Machine Mar. 2, 2010, http://web.archive.org/web/20100302130336/http://!en.wikipedia.org/wiki/Wikipedia:Sign_your_posts_on_talk_pages (pp. 1-4).

* cited by examiner

DOCUMENT PROCESSING SERVICE FOR DISPLAYING COMMENTS INCLUDED IN MESSAGES

This application is a continuation of U.S. patent application Ser. No. 13/249,442 (currently pending) filed Sep. 30, 2011, entitled "System and Method for Providing Document Processing Services," which claims the benefit of provisional patent application Ser. No. 61/453,238, filed Mar. 16, 2011, the entire contents of each of which are hereby incorporated by reference.

TECHNICAL FIELD

This specification relates generally to systems and methods for processing documents, and more particularly to systems and methods for providing online document processing services.

BACKGROUND

Online document processing services allow users to create and manipulate documents via the Internet, and store the documents at a remote location. Typically, a user accesses an online document processing service using a web browser operating on a computer or other device. Many existing document management services offer common word processing functions, including text editing, text searching, etc. By storing a document at the remote location, a user can access the document from any location, using a computer or other user device that has access to the Internet. Some online document processing services allow multiple users to access a document and to collaborate in creating and editing the document.

SUMMARY OF THE INVENTION

In accordance with an embodiment, a method for providing online document processing services is provided. A plurality of comments associated with a document is received, and a representation of the document and a representation of a comment thread comprising the plurality of comments are displayed simultaneously on a user device. In one embodiment, a first comment is received from a first user and a second comment is received from a second user. The comment thread may be stored.

In one embodiment, at least one of the plurality of comments pertains to a change to the document. The document is updated based on the change, and a representation of the updated document and a representation of the comment thread comprising the plurality of comments are displayed simultaneously on the user device.

In another embodiment, a comment associated with the document is received from a first user. It is determined that the comment includes an address associated with a second user, and, in response to determining that the comment comprises the address associated with the second user, a message is transmitted to the address. The address may comprise an email address. The message may comprise a link to a page comprising a representation of the document and a representation of the comment thread.

In another embodiment, a selection of a resolve option is received from a user. In response to the selection of the resolve option, the representation of the comment thread is removed from a display on a user device.

These and other advantages of the present disclosure will be apparent to those of ordinary skill in the art by reference to the following Detailed Description and the accompanying drawings.

DETAILED DESCRIPTION

Figure 1:
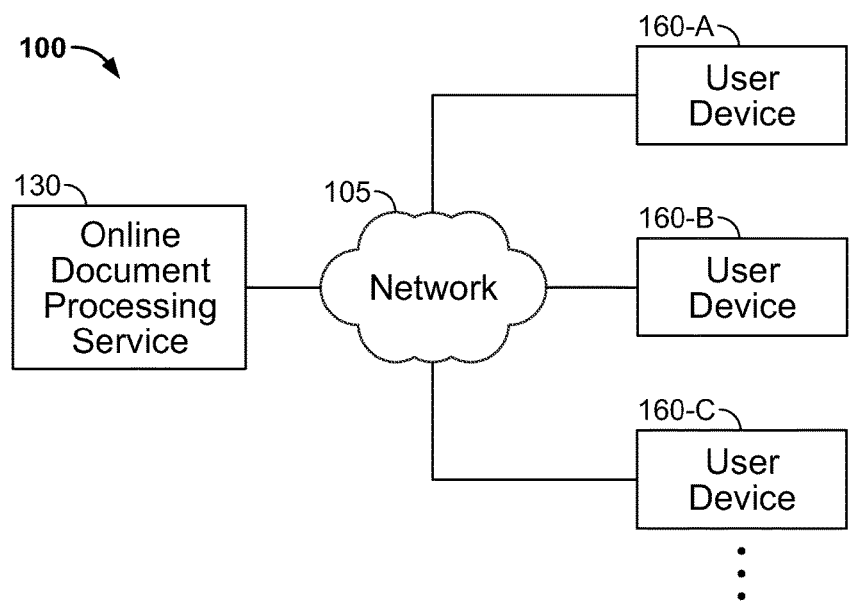
FIG. 1 shows a communication system that may be used to provide document processing services in accordance with an embodiment.

FIG. 1 shows a communication system 100 that may be used to provide document processing services in accordance with an embodiment. Communication system 100 comprises a network 105, an online document processing service 130, and user devices 160-A, 160-B, 160-C, etc. For convenience, the term "user device 160" is used herein to refer to any one of user devices 160-A, 160-B, 160-C, etc. Accordingly, any discussion herein referring to "user device 160," or to a component of a user device, is equally applicable to each of user devices 160-A, 160-B, 160-C, etc. Communication system 100 may comprise more or fewer than two user devices.

In the exemplary embodiment of FIG. 1, network 105 is the Internet. In other embodiments, network 105 may comprise one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

Online document processing service 130 provides document processing services to users via network 105, enabling users to create, display, and edit documents remotely. For example, online document processing service 130 may provide online word processing services, allowing users to create, store, and edit text documents and other types of documents. Online document processing service 130 may be accessible via a World Wide Web page that may be viewed using a conventional Web browser, for example. A user may be required to log into a respective user account to access his or her document(s). Online document processing service 130 may offer common word processing features such as text editing, text searching, table creation and editing, etc. Online document processing service 130 may also provide other functions such as image creation and editing, spreadsheet management, etc. Online document processing service 130 may grant to a user access rights with respect to a document, such as viewing and editing rights.

User device 160 may be any device that enables a user to communicate via network 105. User device 160 may be connected to network 105 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2:
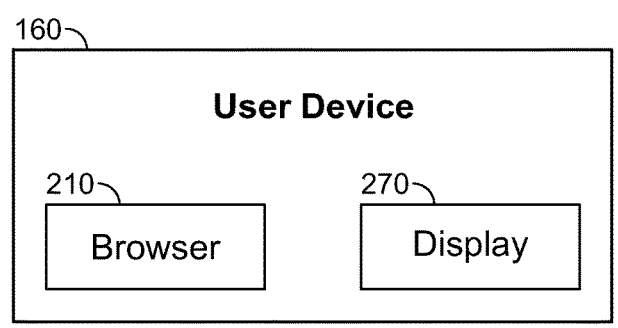
FIG. 2 shows functional components of an exemplary user device.

FIG. 2 shows functional components of an exemplary user device 160 in accordance with an embodiment. User device 160 comprises a web browser 210 and a display 270. Web browser 210 may be a conventional web browser used to access World Wide Web sites via the Internet, for example. Display 270 displays documents, images, Web pages, and other information to a user. For example, a text document that a user creates or edits may be displayed on display 270.

Figure 3:
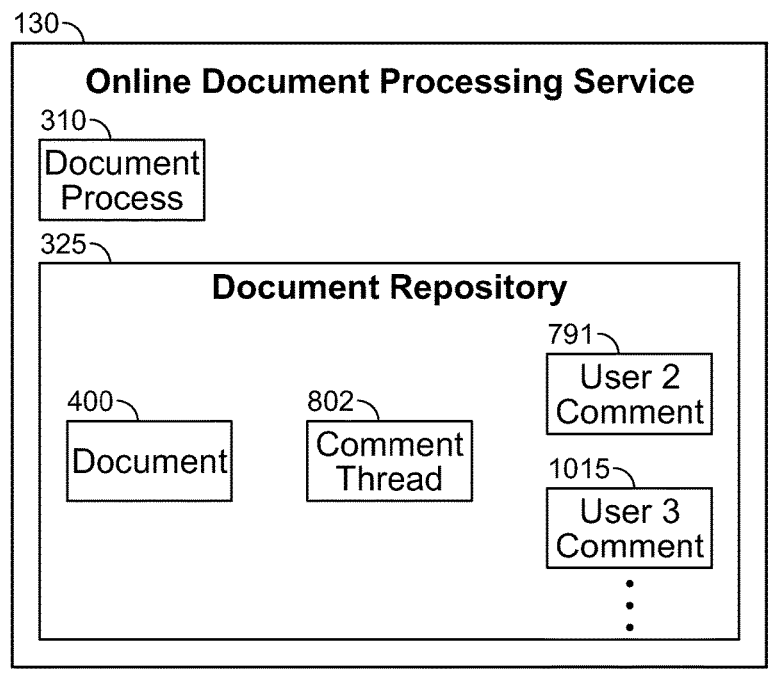
FIG. 3 shows functional components of an online document processing service in accordance with an embodiment.

FIG. 3 shows functional components of online document processing service 130 in accordance with an embodiment. Online document processing service 130 comprises a document process 310 and a document repository 325. Document process 310 manages documents and performs operations requested by users, such as creating documents, editing text, performing text searches, etc. Documents created by users are stored in document repository 325. A document created by a user may be stored in association with his or her user account, for example. Multiple versions of a user's document may be stored in document repository 325. Document process 310 also provides comment and discussion functions allowing users to generate comments relating to documents, and to participate in discussions relating to documents. Information relating to comments and discussions may be stored in document repository 325.

In accordance with the embodiment of FIG. 1, a user may access online document processing service 130 and create and/or edit a document. For example, a user may employ browser 210 to access a World Wide Web site maintained by online document processing service 130. In a well-known manner, the user may be required to log into a user account to access his or her documents. The user may be required to authenticate his or her identity, e.g., by entering a user name and password, before accessing his or her user account and documents associated with the account. Online document processing service 130 may verify the user's access rights with respect to a document before granting the user access to the document.

Figure 4:
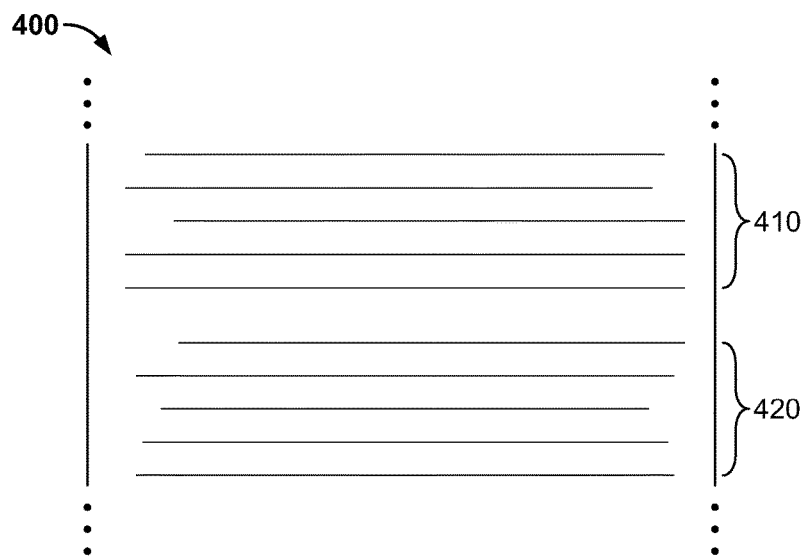
FIG. 4 shows a document in accordance with an embodiment.

Suppose, for example, that a first user, employing user device 160-A, accesses online document processing service 130 and creates a new document, such as document 400 illustrated in FIG. 4. In the illustrative embodiment, document 400 comprises text, including paragraphs 410 and 420.

In various embodiments, a document may comprise lines of text, images, tables, headers, footers, footnotes, etc. Online document processing service 130 stores document 400, or data representing document 400, in document repository 325, as shown in FIG. 3. Online document processing service 130 may store a document model representing document 400, for example. The user may subsequently employ user device 160-A, or another device, to access document 400 via the Internet.

Figure 5:
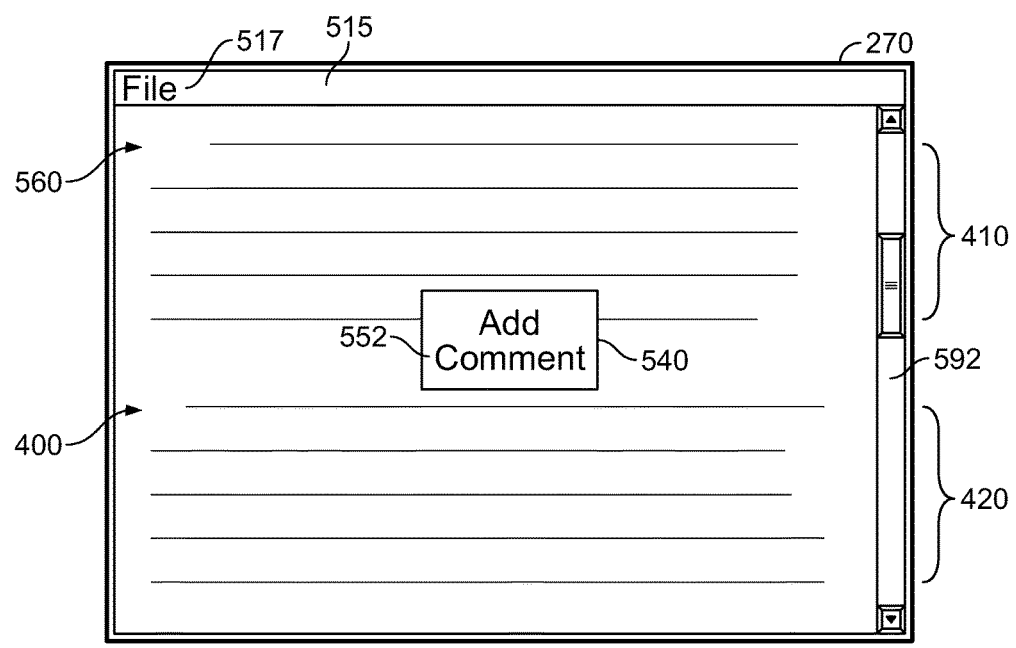
FIG. 5 shows a web page displaying a document in accordance with an embodiment.

A well-known technique used by online document processing services to display a document on a user device includes transmitting data adapted to cause the user device to display all or a portion of the document on a Web page. For example, online document processing service 130 may transmit to browser 210 a request, in the form of HyperText Markup Language (HTML), adapted to cause browser 210 to display a representation of document 400. In response, browser 210 displays a representation of all or a portion of document 400. Suppose, for example, that after the first user creates document 400, a second user employs user device 160-B and accesses online document processing service 130 in order to view document 400. Online document processing service 130 transmits to user device 160-B data adapted to cause the user device to display a portion of document 400 on display 270, as shown in FIG. 5. In this illustrative embodiment, a page 560, including paragraphs 410 and 420, is displayed. Browser 210 also displays a toolbar 515 including various options, such as File option 517, and a scroll bar 592 that allows a user to scroll up or down within document 400.

Figure 6:
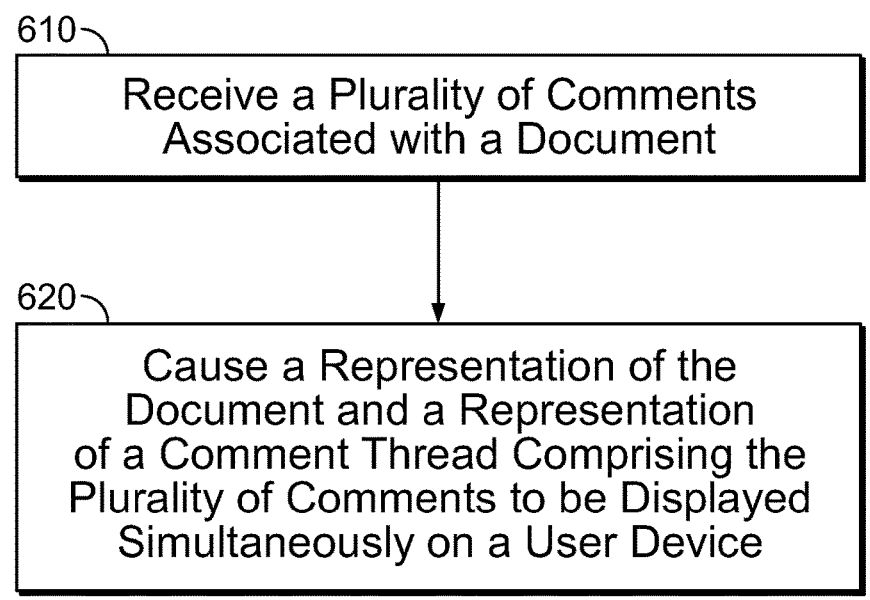
FIG. 6 is a flowchart of a method for providing document processing services in accordance with an embodiment.

In accordance with an embodiment, multiple comments relating to a particular document, received from one user or from multiple users, may be displayed simultaneously with the document on the display of a user device. FIG. 6 is a flowchart of a method for providing online document services in accordance with an embodiment. At step 610, a plurality of comments associated with a document is received. At step 620, a representation of the document and a representation of a comment thread comprising the plurality of comments is caused to be displayed simultaneously on a user device.

Figure 7A:
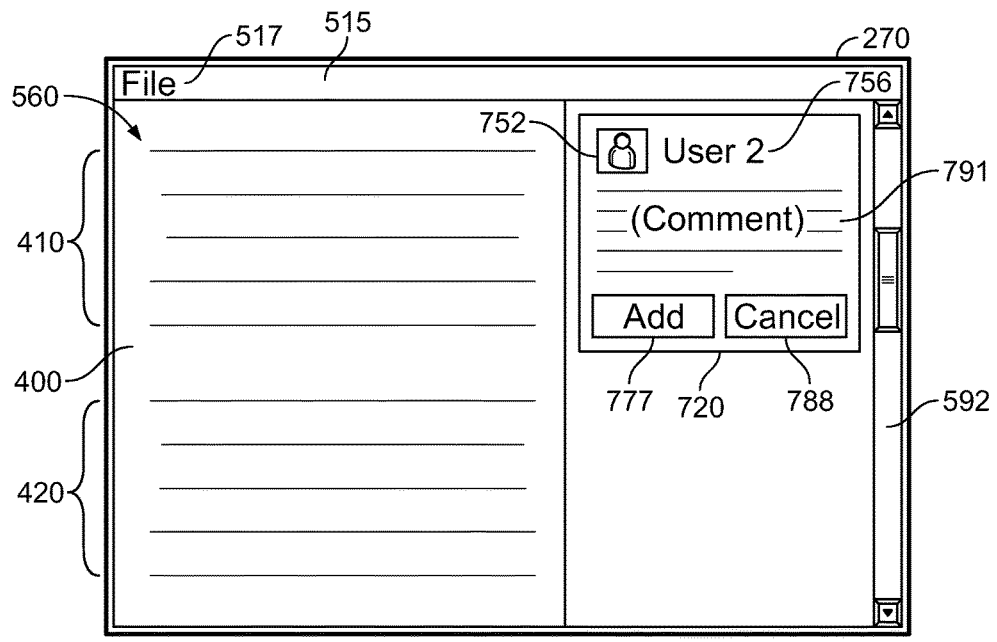
FIG. 7A shows a web page displaying a document in accordance with an embodiment.

Suppose, for example, that while viewing document 400, the second user wishes to add a comment relating to paragraph 410. In an embodiment, the second user may select an option to add a comment. Referring to FIG. 5, for example, the second user may right-click on a computer mouse to cause a menu of options to appear on display 270. In response, online document processing service 130 causes browser 210 to display a menu 540 including an "Add Comment" option 552. When the second user selects Add Comment option 552, browser 210 transmits the selection to online document processing service 130. In response, online document processing service causes browser 210 to display a region in which the user may compose a comment. Referring to FIG. 7A, browser 210 may display page 560, including paragraphs 410 and 420, in a left-hand portion of display 270, and display, in a right-hand portion of the display, a comment box 720 in which the second user may compose a comment. Comment box 720 comprises an image 752 or other representation of the second user, and an indication 756 of the second user's name, nickname, username, title, etc.

After the second user composes a comment within comment box 720, the second user may either post the comment, by selecting an add option 777, or may choose to cancel the comment, by selecting a cancel option 788. In the illustrative embodiment, the second user selects add option 777.

Figure 7B:
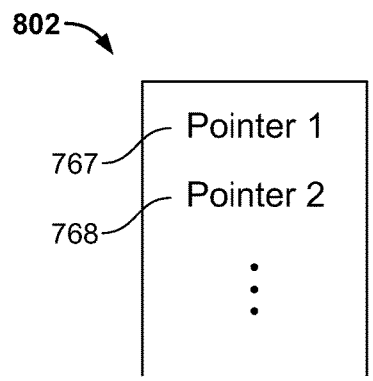
FIG. 7B illustrates a comment thread in accordance with an embodiment.

Browser 210 transmits the selection, and the second user's comment, to online document processing service 130. In response, online document processing service 130 stores the second user's comment in document repository 325, as comment 791, as shown in FIG. 3. In the embodiment of FIG. 3, online document processing service 130 defines a comment thread 802 associated with document 400, and stores comment 791 in association with comment thread 802. As used herein, the term "thread" means a data structure comprising information relating to one or more associated comments. In one example, various related comments in a thread may be stored at various memory locations within document repository 325, and the comment thread may comprise pointers to the various comments. FIG. 7B illustrates comment thread 802 in accordance with an embodiment. Comment thread 802 comprises a pointer 767 associated with comment 791, for example. A comment thread may comprise other types of information. Other data structures, such as a database, may be used to define and/or store a comment thread.

Online document processing service 130 transmits to user device 160-B, and to other user devices, data adapted to cause the user device to display simultaneously a representation of document 400 and a representation of comment thread 802. In response, browser 210 may display, on display 270, a page such as that shown in FIG. 8. Page 560 of document 400, including paragraphs 410 and 420, is displayed in a left-hand portion of display 270. Comment thread 802, including the second user's comment 791, is displayed simultaneously in a right-hand portion of display 270.

Figure 8:
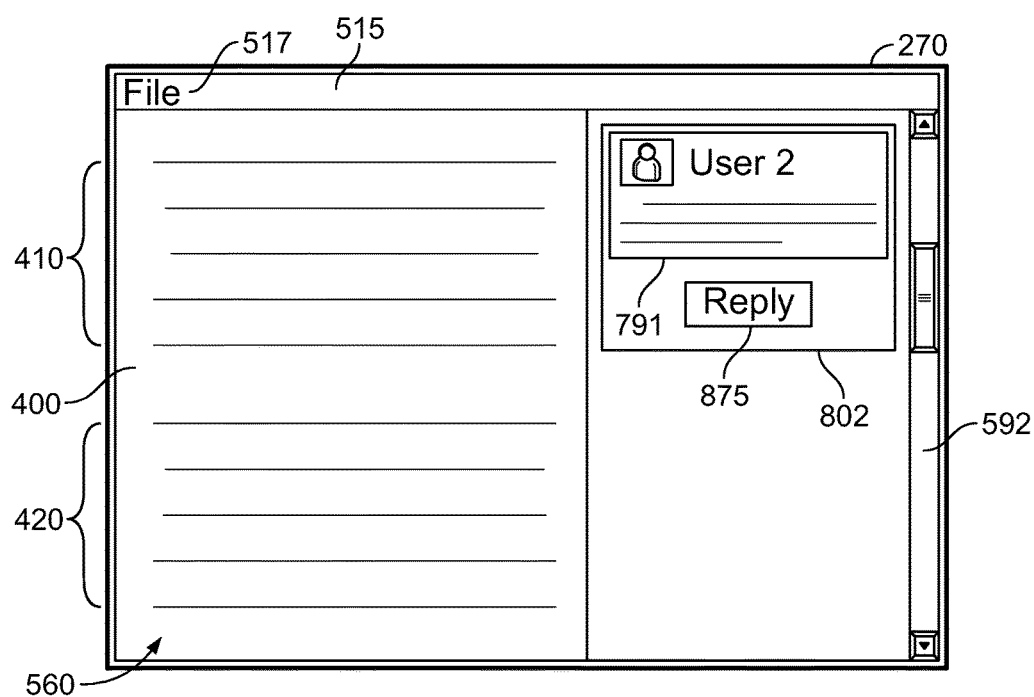
FIG. 8 shows a web page displaying a document in accordance with an embodiment.

As indicated in FIG. 8, a reply option 875 is displayed in association with comment thread 802. Reply option 875 allows a user to reply to comment 791 or otherwise to add an additional comment to comment thread 802.

Figure 9:
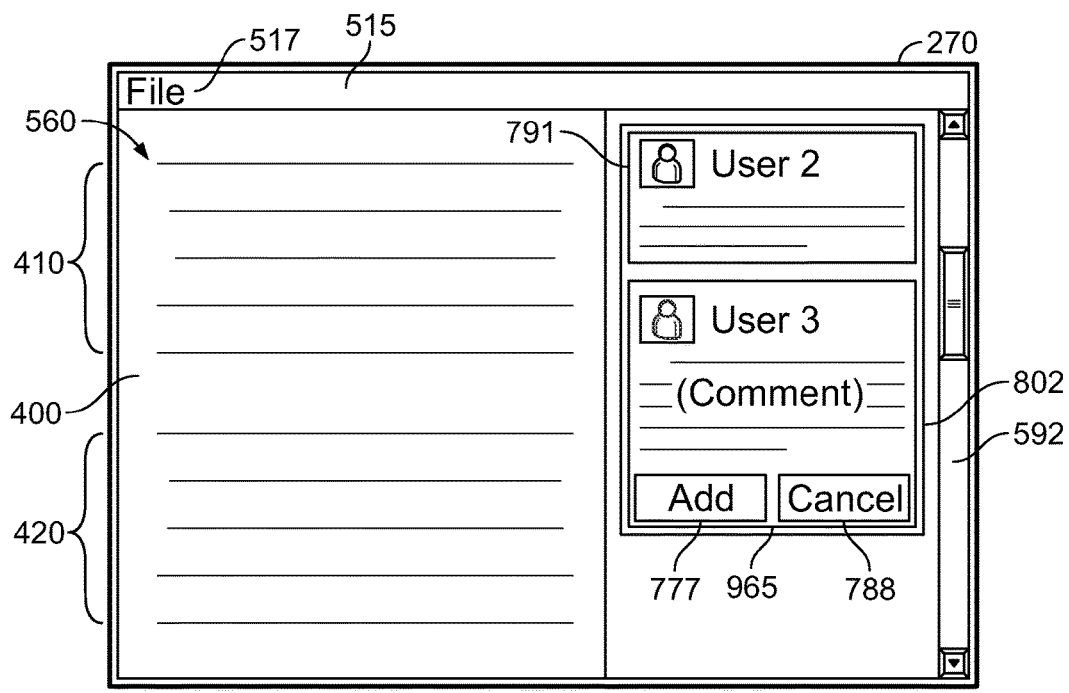
FIG. 9 shows a web page displaying a document in accordance with an embodiment.

After the second user's comment 791 is received and posted, as discussed above, additional comments may be received from other users. Suppose, for example, that a third user, employing user device 160-C (shown in FIG. 1), views document 400, and comment 791, and wishes to add a comment in reply to comment 791. The third user may select reply option 875, using a computer mouse, for example. Browser 210 transmits the selection of reply option 875 to online document processing service 130. In response, online document processing service 130 transmits to user device 160-C data adapted to cause the user device to display a comment box allowing the third user to compose a comment. For example, online document processing service 130 may transmit a request that browser 210 display document 400 and comment thread 802 simultaneously, and that browser 210 include an additional comment box in association with comment thread 802. In response, browser 210 may display, on display 270 of user device 160-C, a web page such as that shown in FIG. 9. Page 560 of document 400, including paragraphs 410 and 420, is displayed in a left-hand portion of display 270. Comment thread 802, including the second user's comment 791, is simultaneously displayed in a right-hand portion of display 270. In the illustrative embodiment, a comment box 965 is displayed in which the third user may compose a reply comment.

In the illustrative embodiment, the third user composes a reply comment and selects add option 777. User device 160-C transmits the third user's selection, and the third user's comment, to online document processing service 130. Online document processing service 130 stores the third user's comment in document repository 325, as comment 1015, as shown in FIG. 3. Online document processing service 130 also updates comment thread 802 to include a pointer 768 (and/or other information) associated with the third user's comment 1015, as shown in FIG. 7B. Online document processing service 130 may then transmit to user device 160-C (and to other user devices) a request to display simultaneously document 400 and updated comment thread 802. In response, browser 210 displays, on display 270, a page such as that shown in FIG. 10. Page 560 of document 400, including paragraphs 410 and 420, is displayed in a left-hand portion of display 270. Comment thread 802, including the second user's comment 791 and the third user's comment 1015, are displayed within comment thread 802 in the right-hand portion of display 270.

Enabling users to maintain comment threads associated with a document, and displaying the comment threads simultaneously with the document, as described herein, provides particular advantages in the context of document production and management. Allowing users to view comments in real-time along with the document improves communication among users, provides a more efficient workflow and accelerates document production.

Figure 10:
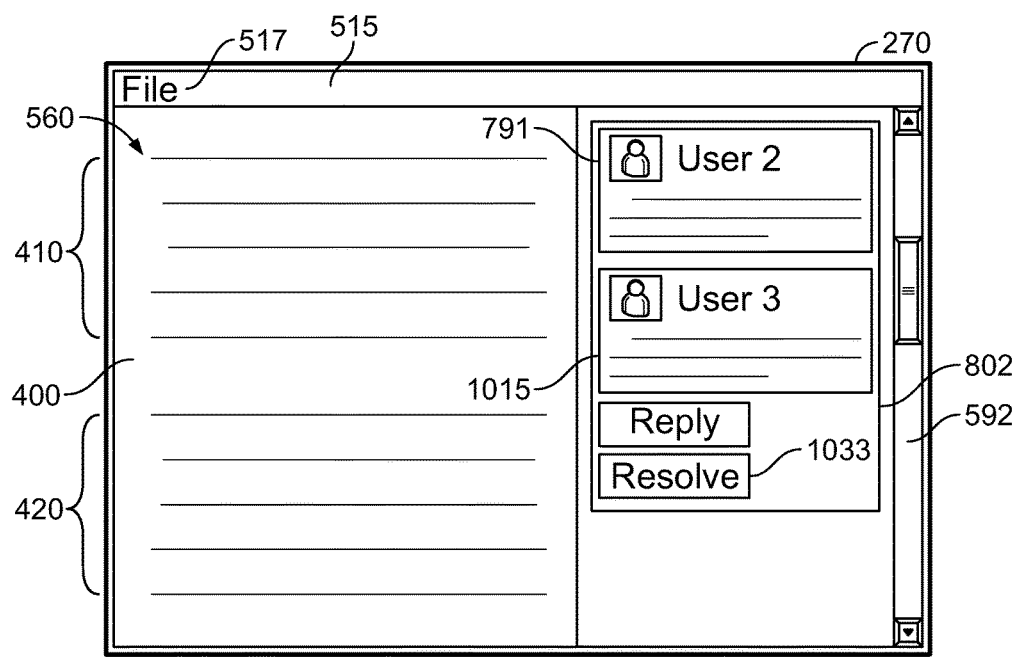
FIG. 10 shows a web page displaying a document in accordance with an embodiment.

Referring to FIG. 10, a resolve option 1033 is also displayed in association with comment thread 802. In accordance with an embodiment, when a user selects the resolve option, comment thread 802 is removed from the display on each user's device, and is no longer displayed in association with document 400. However, comment thread 802, and the associated comments, remain stored in repository 325 and may be re-opened by a user at a later time. For example, if a particular user selects resolve option 1033, document processing service 130 may transmit a resolve notification message to one or more users associated with document 400 indicating that a user has selected the resolve option. For example, a resolve notification message may be transmitted to all users associated with the comment thread. Upon receipt of a resolve notification message, a user device 160 may display a message such as message 1122 shown in FIG. 11. In this example, notification message 1122 states that "A user has resolved this comment thread."

Figure 11:
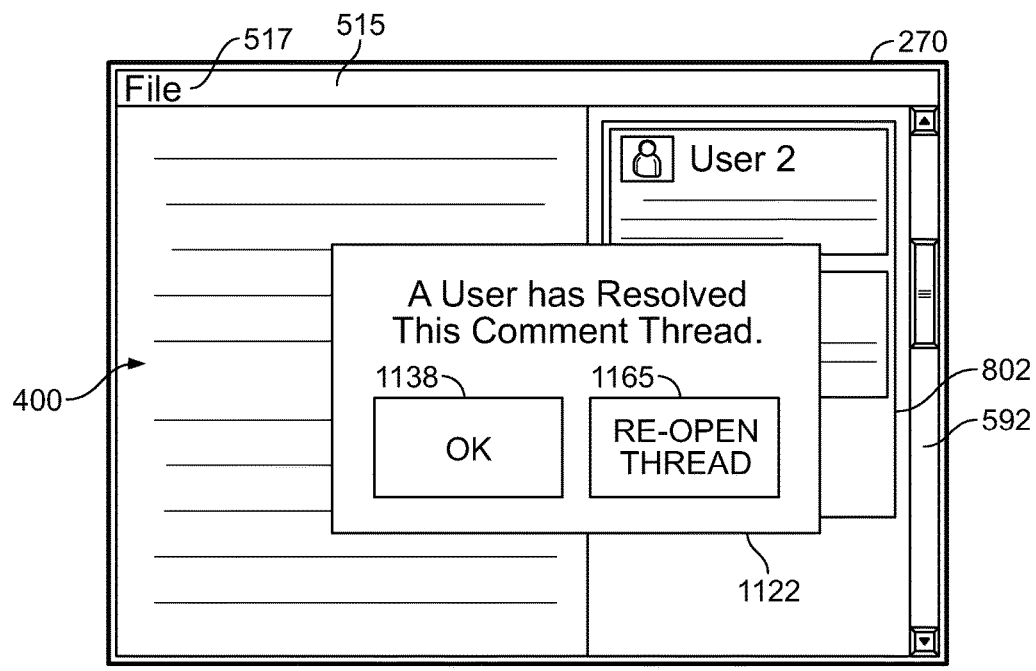
FIG. 11 shows a web page displaying a document in accordance with an embodiment.

Each recipient of the resolve notification message is provided an option to object to the resolution of the comment thread. Referring to FIG. 11, for example, notification message 1122 includes an "OK" option 1138 which a user may select if he or she agrees with the resolution of the comment thread, and a "Re-Open Thread" option 1165, which the user may select if the user does not want the thread to be resolved. If a user selects Re-Open option 1165, comment thread 802 is re-opened and continues to appear on display 270 in association with document 400.

Figure 12:
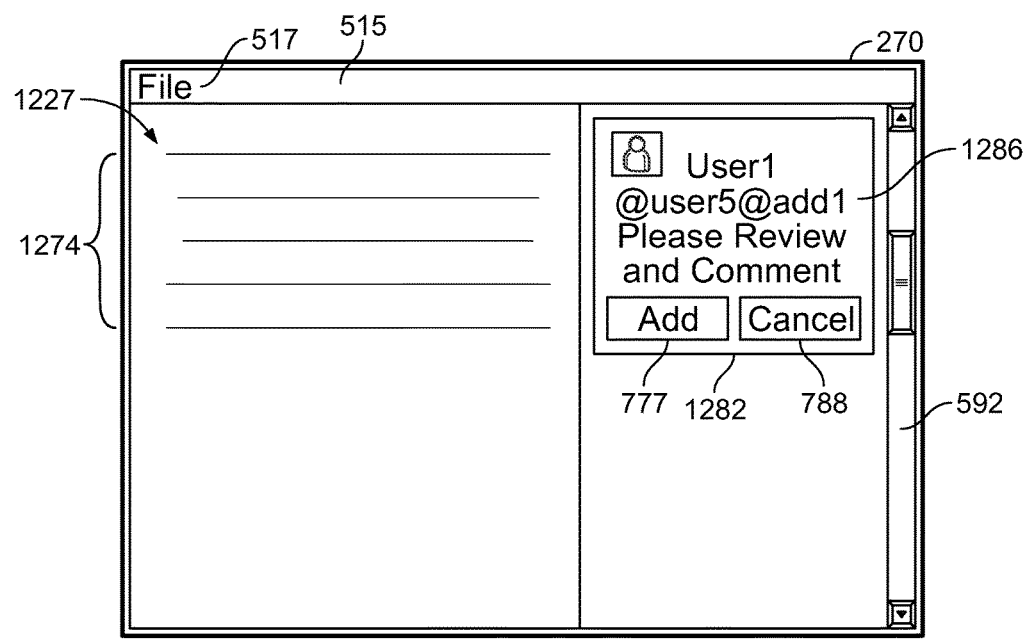
FIG. 12 shows a web page displaying a document in accordance with an embodiment.

In accordance with another embodiment, a first user may include in a comment an address associated with a second user. The inclusion of the second user's address in the comment causes a message to be generated and sent to the second user. Referring to FIG. 12, suppose that the first user reviewing a page 1227 of a document selects a comment option (in the manner described above) to add a comment associated with a particular paragraph 1274. In response, document processing service 130 displays a comment box 1282.

Figure 13:
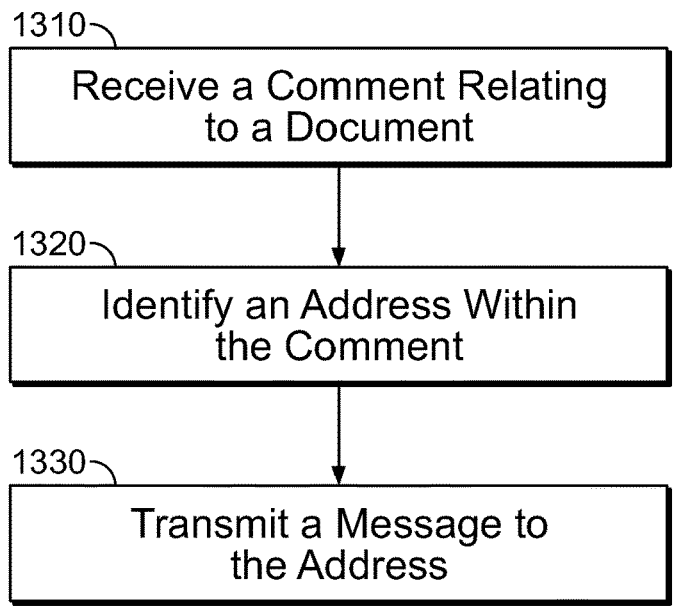
FIG. 13 is a flowchart of a method of providing online document processing services in accordance with an embodiment.

FIG. 13 is a flowchart of a method of providing electronic messaging services in accordance with an embodiment. In the illustrative embodiment of FIG. 12, a first user composes a comment in box 1282, and includes in the comment an email address 1286 associated with another user, "User5." In the illustrative example of FIG. 12, the first user types "@user5@add1," which includes a selected symbol "@" followed by a string of alphanumeric characters representing an email address of User5. It is to be understood that the alphanumeric characters used above to represent an email address are representative only, and that other characters, symbols, and formats may be used.

In one embodiment, when a comment box is displayed and a user is composing a comment, the alphanumeric characters typed by the user within the comment box are monitored, and when the "@" symbol is detected, a list of addresses associated with the document is displayed to the user. For example, a list of email addresses of other users associated with the document may be displayed. The user may select one of the displayed addresses for inclusion in the comment.

At step 1310, a comment relating to a document is received from a first user. When the first user indicates that the comment is complete, by selecting add option 777, for example, document processing service 130 receives the comment from user device 160, establishes a comment thread, if necessary, and adds the comment to the comment thread, in the manner described above.

At step 1320, an address is identified within the comment. Accordingly, document processing service 130 examines the first user's comment and determines that the first user's comment includes the email address "user5@add1," associated with User5. At step 1330, a message is transmitted to the address. Document processing service 130 generates an email message and transmits the message to the email address "user5@add1." The email message may notify User5 that a comment has been posted that includes the email address associated with User5, for example. The email message may also include a copy of the first user's comment. The message may include other information. For example, the email message may include a link that enables the recipient of the message to click on the link and post a reply to the first user's comment. Clicking on the link may cause the recipient's user device to connect to document processing service 130, access the document, and display the first user's comment and a relevant portion of the document, for example. While in the illustrative embodiment an email address is included in a comment, in other embodiments, other types of addresses may be used.

In various embodiments, the method steps described herein, including the method steps described in FIGS. 6 and/or 13, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 6 and/or 13. Certain steps of the methods described herein, including one or more of the steps of FIGS. 6 and/or 13, may be performed by a server or by another processor in a network-based cloud-computing system. Certain steps of the methods described herein, including one or more of the steps of FIGS. 6 and/or 13, may be performed by a client computer in a network-based cloud computing system. The steps of the methods described herein, including one or more of the steps of FIGS. 6 and/or 13, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 6 and/or 13, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 14:
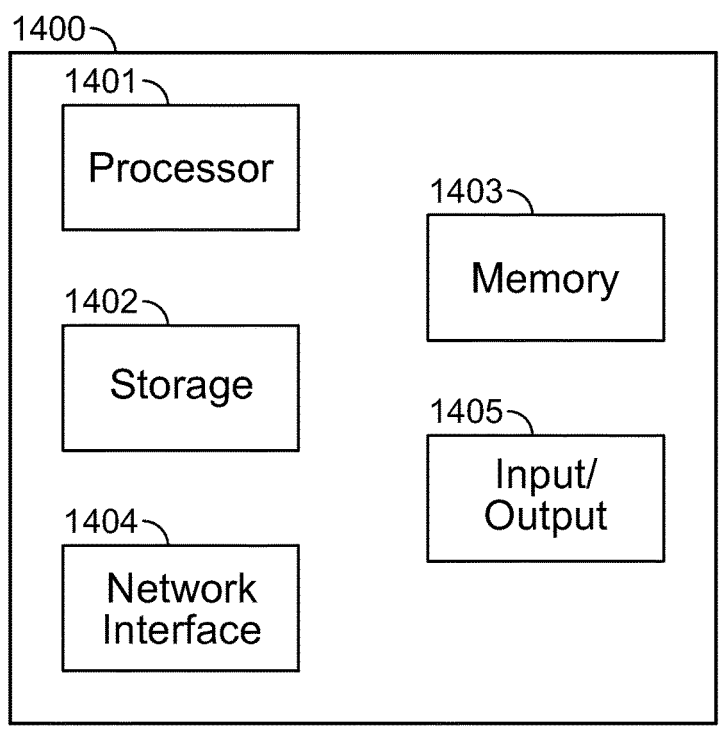
FIG. 14 shows components of a computer that may be used to implement the invention.

A high-level block diagram of an exemplary computer that may be used to implement systems, apparatus and methods described herein is illustrated in FIG. 14. Computer 1400 comprises a processor 1401 operatively coupled to a data storage device 1402 and a memory 1403. Processor 1401 controls the overall operation of computer 1400 by executing computer program instructions that define such operations. The computer program instructions may be stored in data storage device 1402, or other computer readable medium, and loaded into memory 1403 when execution of the computer program instructions is desired. Thus, the method steps of FIGS. 6 and/or 13 can be defined by the computer program instructions stored in memory 1403 and/or data storage device 1402 and controlled by the processor 1401 executing the computer program instructions. For example, the computer program instructions can be implemented as computer executable code programmed by one skilled in the art to perform an algorithm defined by the method steps of FIGS. 6 and/or 13. Accordingly, by executing the computer program instructions, the processor 1401 executes an algorithm defined by the method steps of FIGS. 6 and/or 13. Computer 1400 also includes one or more network interfaces 1404 for communicating with other devices via a network. Computer 1400 also includes one or more input/output devices 1405 that enable user interaction with computer 1400 (e.g., display, keyboard, mouse, speakers, buttons, etc.).

Processor 1401 may include both general and special purpose microprocessors, and may be the sole processor or one of multiple processors of computer 1400. Processor 1401 may comprise one or more central processing units (CPUs), for example. Processor 1401, data storage device 1402, and/or memory 1403 may include, be supplemented by, or incorporated in, one or more application-specific integrated circuits (ASICs) and/or one or more field programmable gate arrays (FPGAs).

Data storage device 1402 and memory 1403 each comprise a tangible non-transitory computer readable storage medium. Data storage device 1402, and memory 1403, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1405 may include peripherals, such as a printer, scanner, display screen, etc. For example, input/output devices 1405 may include a display device such as a cathode ray tube (CRT) or liquid crystal display (LCD) monitor for displaying information to the user, a keyboard, and a pointing device such as a mouse or a trackball by which the user can provide input to computer 1400.

Any or all of the systems and apparatus discussed herein, including online document processing service 130, user device 160, and components thereof, including web browser 210, display 270, document process 310, and document repository 325, may be implemented using a computer such as computer 1400.

One skilled in the art will recognize that an implementation of an actual computer or computer system may have other structures and may contain other components as well, and that FIG. 14 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
   receiving a first comment for an electronic document from a first user via a first user device, wherein the first comment comprises a particular symbol followed by one or more characters representing a user address of a second user;
   storing the first comment in a comment thread associated with the electronic document;
   transmitting data to the first user device to display a first representation of the comment thread on the first user device;
   extracting, by a server, the user address from the first comment stored in the comment thread;
   automatically sending a first email message to a second user device of the second user, by the server, based on the extracted user address, wherein the first email message comprises the first comment, and a link to a page that, when selected, causes a representation of the electronic document and a second representation of the comment thread to be displayed simultaneously on the second user device;
   receiving a selection of a resolve option from the second user via the second user device responsive to sending the first email message; and
   transmitting, responsive to the selection of the resolve option, a plurality of notifications to remove the first representation and the second representation of the comment thread with the first comment from a display of the first user device and a display of the second user device.

2. The method of claim 1, further comprising:
   receiving a second email message in reply to the first email message, wherein the second email message comprises a second comment; and
   transmitting data to cause display of the second comment on the display of the first user device.

3. The method of claim 2, further comprising: associating the second comment with the comment thread; and transmitting, to the first user device, data to first representation of the comment thread on the first user device, wherein the updated first representation comprises the first comment from the first user and the second comment.

4. The method of claim 3, further comprising: receiving a third comment responsive to the updated first representation of the comment thread;
   associating the third comment with the comment thread; and transmitting, to the first user device, data to further update the updated first representation of the comment thread on the first user device to comprise the third comment.

5. The method of claim 4, further comprising:
   transmitting, to the second user device, data to update the displayed second representation of the comment thread on the second user device to comprise the second comment and the third comment.

6. A method comprising:
   displaying, on a display device at a first user device, a representation of an electronic document;
   receiving a request to add a comment related to a portion of the displayed representation of the electronic document from a first user at the first user device;
   in response to receiving the request, displaying, on the display device, a region in which the first user may input one or more characters for the comment;
   monitoring the characters for a particular character as the characters are received from the first user at the first user device;

in response to detecting that the particular character has been received, displaying, on the display device, one or more user addresses of users associated with the electronic document;

receiving, at the first user device from the first user, a selection of a user address, for a second user, among the displayed user addresses and an indication that the comment is complete; and in response to receiving the indication, sending, from the first user device and to a server, the comment comprising the characters, and wherein the characters comprise the particular character followed by the selected user address, wherein sending the comment to the server causes the server to extract the selected user address from the comment and send a first email message to the second user at a second user device based on the extracted user address, wherein the first email message comprises the comment and a link to a page that, when selected, causes a the representation of the portion of the electronic document related to the comment and a representation of a comment thread to be displayed simultaneously on a display device of the second user device, and wherein the comment thread comprises the comment and a resolve option that allows the second user to remove the representation of the comment thread from a display device of at least one other user device.

7. The method of claim 6, further comprising:
receiving, from the second user at the second user device, a selection of a the resolve option to remove the representation of a the comment thread from the display device of the other user device.

8. The method of claim 7, further comprising:
removing the representation of the comment thread from the display device of the other user device.

9. A system comprising:
a memory that stores instructions: and
a processor configured to execute the instructions to:
receive a first comment for an electronic document from a first user via a first user device, wherein the first comment comprises a particular symbol followed by one or more characters representing a user address of a second user;
store the first comment in a comment thread associated with the electronic document;
transmit data to the first user device to display a first representation of the comment thread on the first user device;
extract, by a server, the user address from the first comment stored in the comment thread;
automatically send a first email message to a second user device of the second user, by the server, based on the extracted user address, wherein the first email message comprises the first comment, and a link to a page that, when selected, causes a representation of the electronic document and a second representation of the comment thread to be displayed simultaneously on the second user device;
receive a selection of a resolve option from the second user via the second user device responsive to having sent the first email message; and transmit, responsive to the selection of the resolve option, a plurality of notifications to remove the first representation and the second representation of the comment thread with the first comment from a display of the first user device and a display of the second user device.

10. The system of claim 9, wherein the processor is further configured to execute the instructions to:
receive a second email message in reply to the first email message, wherein the second email message comprises a second comment; and
transmit data to cause display of the second comment on the display of the first user device.

11. The system of claim 10, wherein the processor is further configured to execute the instructions to:
associate the second comment with the comment thread; and transmit, to the first user device, data to update the displayed first representation of the comment thread on the first user device, wherein the updated first representation comprises the first comment from the first user and the second comment.

12. The system of claim 11, wherein the processor is further configured to execute the instructions to:
receive a third comment responsive to the updated first representation of the comment thread;
associate the third comment with the comment thread; and transmit, to the first user device, data to further update the updated first representation of the comment thread on the first user device to comprise the third comment.

13. The system of claim 12, wherein the processor is further configured to execute the instructions to:
transmit, to the second user device, data to update the displayed second representation of the comment thread on the second user device to comprise the second comment and the third comment.

14. A system comprising:
a memory that stores instructions; and
a processor configured to execute the instructions to:
display, on a display device at a first user device, a representation of an electronic document;
receive a request to add a comment related to a portion of the displayed representation of the electronic document from a first user at the first user device;
in response to the receipt of the request, display, on the display device, a region in which the first user may input one or more characters for the comment;
monitor the characters for a particular character as the characters are received from the first user at the first user device;
in response to a detection that the particular character has been received, display, on the display device, one or more user addresses of users associated with the electronic document;
receive, at the first user device from the first user, a selection of a user address, for a second user, among the displayed user addresses and an indication that the comment is complete; and
in response to the receipt of the indication, send, from the first user device and to a server, the comment comprising the characters, and wherein the characters comprise the particular character followed by the selected user address, wherein sending the comment to the server causes the server to extract the selected user address from the comment and send an email message to the second user at a second user device based on the extracted user address, wherein the email message comprises the comment and a link to a page that, when selected, causes the representation of the portion of the electronic document related to the comment and a representation of a comment thread to be displayed simultaneously on a display device of the second user device, and wherein the comment thread comprises the comment and a resolve option that allows the second user to remove the representation of the comment thread from a display device of at least one other user device.

15. The system of claim 14, wherein the processor is further configured to execute the instructions to:
receive, from the second user at the second user device, a selection of the resolve option to remove the representation of the comment thread from the display device of the other user device.

16. The system of claim 15, wherein the processor is further configured to execute the instructions to:
remove the representation of the comment thread from the display device of the other user device.

* * * * *